US007853709B2

(12) United States Patent
Cheng et al.

(10) Patent No.: US 7,853,709 B2
(45) Date of Patent: Dec. 14, 2010

(54) MULTIMEDIA DATA SHARING SYSTEM AND METHOD FOR MOST NETWORK

(75) Inventors: Yong-Hua Cheng, Kaohsiung (TW); Yi-Hung Lu, Kaohsiung (TW); Yu-Ching Lin, Kaohsiung (TW); Chia-Ling Liu, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 231 days.

(21) Appl. No.: 12/192,926

(22) Filed: Aug. 15, 2008

(65) Prior Publication Data
US 2009/0172181 A1 Jul. 2, 2009

(30) Foreign Application Priority Data
Dec. 31, 2007 (TW) .............................. 96151432 A

(51) Int. Cl.
*G06F 15/16* (2006.01)
(52) U.S. Cl. ....................................... 709/230; 709/250
(58) Field of Classification Search ................. 709/203, 709/227, 250; 701/1, 2, 36
See application file for complete search history.

(56) References Cited

U.S. PATENT DOCUMENTS

| 6,832,283 | B2 | 12/2004 | Boesinger et al. |
| 7,089,343 | B2 | 8/2006 | Bahren |
| 7,149,653 | B2 | 12/2006 | Bihler et al. |
| 7,181,511 | B1 | 2/2007 | Grenier et al. |
| 7,590,127 | B2 * | 9/2009 | Krusche et al. ............. 370/401 |
| 2002/0023137 | A1 | 2/2002 | Bahren et al. |
| 2002/0032789 | A1 | 3/2002 | Bahren et al. |
| 2002/0054520 | A1 | 5/2002 | Bahren et al. |
| 2002/0098854 | A1 | 7/2002 | Becker et al. |
| 2002/0110132 | A1 | 8/2002 | Becker et al. |

FOREIGN PATENT DOCUMENTS

| DE | 102005061141 A1 | 6/2007 |
| EP | 1088369 B1 | 5/2004 |

OTHER PUBLICATIONS

Leen at al., "Expanding Automative Electronic Systems" IEEE Computer, 2002.*
Bauer et al., "A Flexible Integration Strategy for In-Car Telematics Systems", ICSE SEAS'05, May 21, 2005.*
Media Oriented Systems Transport, Multimedia and Control Networking Technology, Most Specification Framework Rev 1.1, pp. 60, 1999.

* cited by examiner

*Primary Examiner*—Yemane Mesfin

(57) ABSTRACT

A multimedia data sharing system and method for a MOST network is disclosed. The system provides a service management module, a data link control module, and a protocol conversion module. The service management module provides state analysis and management for all services of the multimedia data sharing system and records analyzed service states and configuration results in a service management list. The data link control module performs a control and management process for system data streams based on information stored in the service management list. The protocol conversion module retrieves data from a channel register, based on the information stored in the service management list, to perform a MOST link management operation and implements a packaged or an unpackaged operation to data packets for access of the MOST network.

14 Claims, 8 Drawing Sheets

MULTIMEDIA DATA SHARING SYSTEM AND METHOD FOR MOST NETWORK

CROSS REFERENCE TO RELATED APPLICATIONS

This Application claims priority of Taiwan Patent Application No. 96151432, filed on Dec. 31, 2007, the entirety of which is incorporated by reference herein.

BACKGROUND OF THE INVENTION

1. Field of the Invention

The invention relates to a data sharing method and system, and more particularly to a multimedia data sharing system and method for a MOST network.

2. Description of the Related Art

In the future, mobile communication technology will enable a car to be a mobile office or an entertainment theater, integrating wireless communication equipment, multimedia networks and customized software and hardware platforms to provide digital entertainment. Mobile communication technology for cars at least comprises telematics, real-time multimedia entertainment on demand, and plug-and-play for portable devices.

Telematics services, such as remote diagnostics, connect a car to a back end server to receive and transmit information for accessing network resources such as home networks, electronic toll collection (ETC), traffic navigation, and so forth. Meanwhile, real-time multimedia entertainment on demand services, enable a passenger to request real-time multimedia services and retrieve real-time multimedia entertainment services such as video and audio and navigation information. As for plug and play services for portable devices, a portable device (such as an MPEG Audio Layer 3 (MP3) player, a personal digital assistant (PDA), and the like) is allowed to connect to an in-car device for operation. The described telematics services are provided by using mobile wide bandwidth and wireless communication technology such as Worldwide Interoperability for Microwave Access (WiMAX), High Speed Downlink Packet Access (HSDPA), Media Oriented Systems Transport (MOST), and information and communication system integration technology.

Mobile wide bandwidth and wireless communication technology allows for communication to occur between a car and an outside environment, wherein a car is connected to a back end server to receive and transmit information for accessing network resources such as home networks, electronic toll collection (ETC), traffic navigation, and so forth.

The MOST network, enables passengers, independently or for sharing, to request real-time multimedia services and retrieve real-time multimedia entertainment services such as video and audio and navigation information. In one example, the video and audio host can transmit different audio and video files to different display devices, so that each display device can simultaneously display different program content.

Information and communication system integration technology, integrates multiple communication interfaces, such as Control Area Network (CAN), Universal Serial Bus (USB), Institute of Electrical and Electronic Engineers (IEEE) 1394, Ethernet, and so forth, by interface protocol conversion to an automotive gateway. Connection of various portable devices is enabled and a sharing system for various plug-and play devices is provided to in-car users.

As described, the telematics services provide communication between a car and an external environment, comprising, for example, real-time navigation and traffic alarms for driver convenience and security and multimedia video and audio entertainment and mobile broadband network access for passenger usage and sharing. Although the MOST network, is the most widely applied high speed multimedia network transmission protocol for telematics services, a first generation MOST network does not provide multimedia video transmission as a standard feature.

Thus, the invention provides a multimedia data sharing system and method for a MOST network. The MOST network, integrates multiple communication interfaces to enable connection of various portable devices and provide a sharing system for various plug-and play devices.

BRIEF SUMMARY OF THE INVENTION

Multimedia data sharing methods for a MOST network are provided. An exemplary embodiment of a multimedia data sharing method for a MOST network comprises the following. When a portable device being plugged in is detected, a service management module is activated and a registration process for the portable device is completed. A service command instructed by a human-machine interface is detected and a service scheduling method is performed to complete service registration. Dynamic bandwidth allocation and memory management are performed based on the service states of the portable device and performed results are stored in a service management list. A first service is activated and an information source of the first service is determined. If the information source is the MOST network, a protocol conversion module is activated and a MOST net service operation is performed to retrieve a data packet from the MOST network and unpack the data packet. A MOST link management process is performed which implements link settings to stream data of the MOST net according to the service management list and output the data packet to a corresponding first channel register according to a format of the stream data. A data link control module is activated to retrieve plural data packets from the first channel register based on corresponding information in the service management list and a flow control operation is performed. A link management process is performed to analyze the stream data and output the data packet to a corresponding first device memory according to the service management list.

Multimedia data sharing systems for a MOST network are provided. An exemplary embodiment of a multimedia data sharing system for a MOST network comprises a service management module, a data link control module, and a protocol conversion module. The service management module provides state analysis and management for all services of the multimedia data sharing system and records analyzed service states and configuration results in a service management list. The data link control module performs a control and management process for system data streams based on information stored in the service management list. The protocol conversion module retrieves data from a channel register, based on the information stored in the service management list, to perform a MOST link management operation and implements a packaged or an unpackaged operation to data packets for access of the MOST network.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
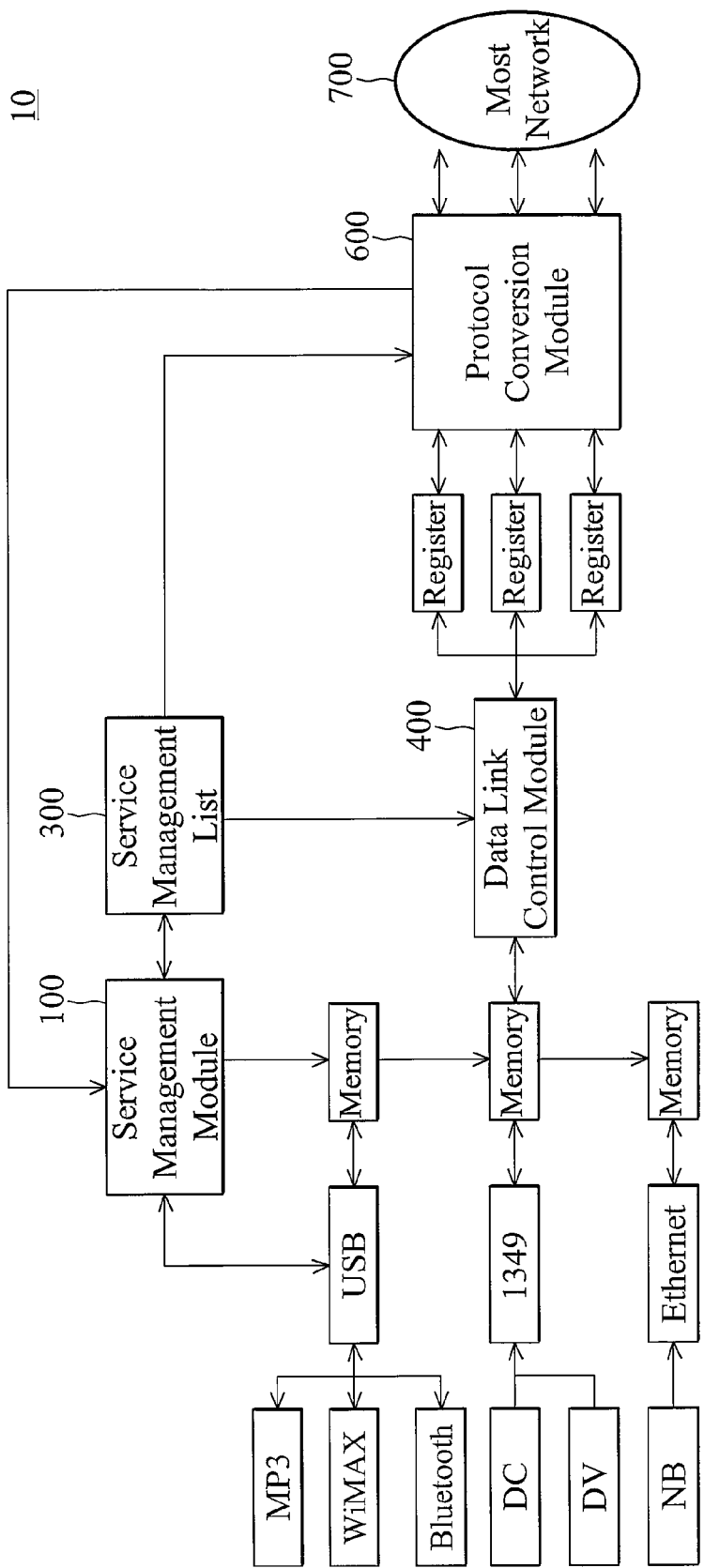
FIG. 1 is a schematic view of a multimedia data sharing system for a MOST network of the present invention.

Several exemplary embodiments of the invention are described with reference to FIGS. 1 through 6b, which generally relate to multimedia data sharing for a MOST network. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a multimedia data sharing system and method for a MOST network.

An embodiment of the multimedia data sharing system enables data transmission via the MOST network and is applied to the latest MOST network standard. The multimedia data sharing system connects different portable devices using an extension interface for MOST network nodes, integrates the MOST network and various communication interfaces (such as the USB, Ethernet, and 1394), and provides minimum latency for data transmission based on MOST network features. The MOST technology supports data transmission rates reaching 150 Mbps and is provided with low cost and volume and convenience, which increases practicability of the MOST network to satisfy market requirements.

FIG. 1 is a schematic view of a multimedia data sharing system for a MOST network of the present invention.

The multimedia data sharing system 10 for a MOST network at least comprises a service management module 100, a data link control module 400, and a protocol conversion module 600.

Figure 2:
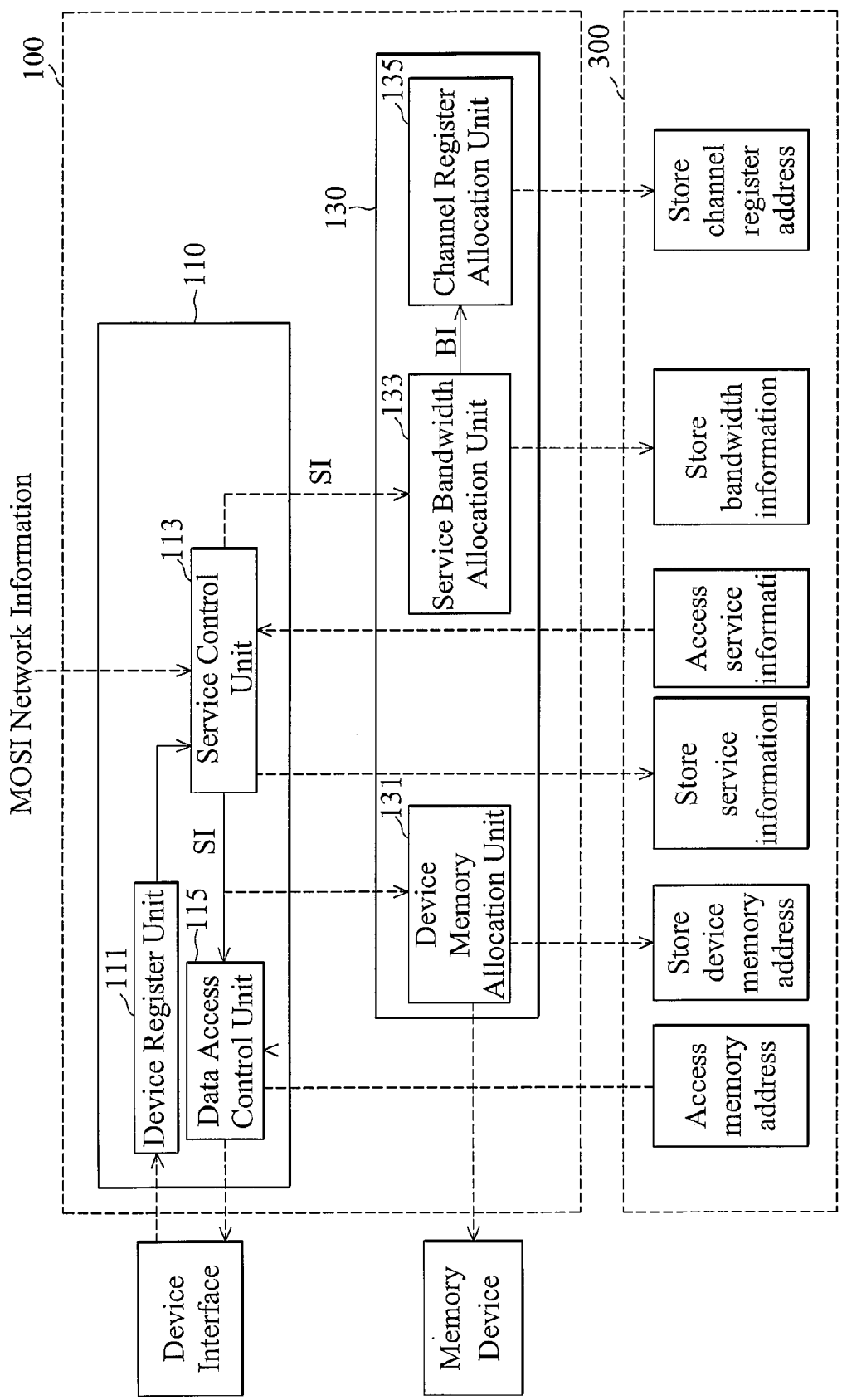
FIG. 2 is a schematic view of a service management module 100 of the present invention.

FIG. 2 is a schematic view of the service management module 100 of the present invention. The service management module 100 at least comprises a service scheduling manager 110 and a dynamic bandwidth/memory manager 130. The service management module 110 provides state analysis and management for services of the multimedia data sharing system 10 and bandwidth or memory allocation for each service and records the analyzed service states and configuration results in a service management list 300. The service management list 300 provides required information contents relating to the data link control module 400 and the protocol conversion module 600.

The service management module 110 comprises a device register unit 111, a service control unit 113, and a data access control unit 115. The dynamic bandwidth/memory manager 130 comprises a device memory allocation unit 131, a service bandwidth allocation unit 133, and a channel register allocation unit 135.

When a portable device is plugged in, the portable device is registered and information and content types relating to the portable device is recorded in the service management list via the device register unit 111.

The service control unit 113 collects current service states from the MOST network 700, analyzes service information contents, and creates required information for services links to provide necessary reference data (comprising, for example, information source/destination addresses, assigned data transmission channels, transmission priorities, and so forth) for inferior units. The service control unit 113 stores the analyzed service information contents in the service management list 300, when a service requirement is generated or terminated, dynamically adjusts contents of the created service link information stored in the service management list 300, and notifies the dynamic bandwidth/memory manager 130 and the data access control unit 115 of performing corresponding operations based on the current service states.

The data access control unit 115 receives commands for performing a data access operation from the service control unit 113 and performs the data access operation based on address information of a device memory in the service management list 300.

The device memory allocation unit 131 performs a dynamic memory allocation operation based on different multimedia forms and present memory capacity.

The service bandwidth allocation unit 133 determines allocation of bandwidth to each service according to required bandwidth size and priority sequence of currently running services under limited bandwidth resources and dynamically adjusts the bandwidth size to enhance system transmission performance.

The channel register allocation unit 135 performs dynamic memory allocation for channel registers according to allocated bandwidth size to each service.

Figure 3:
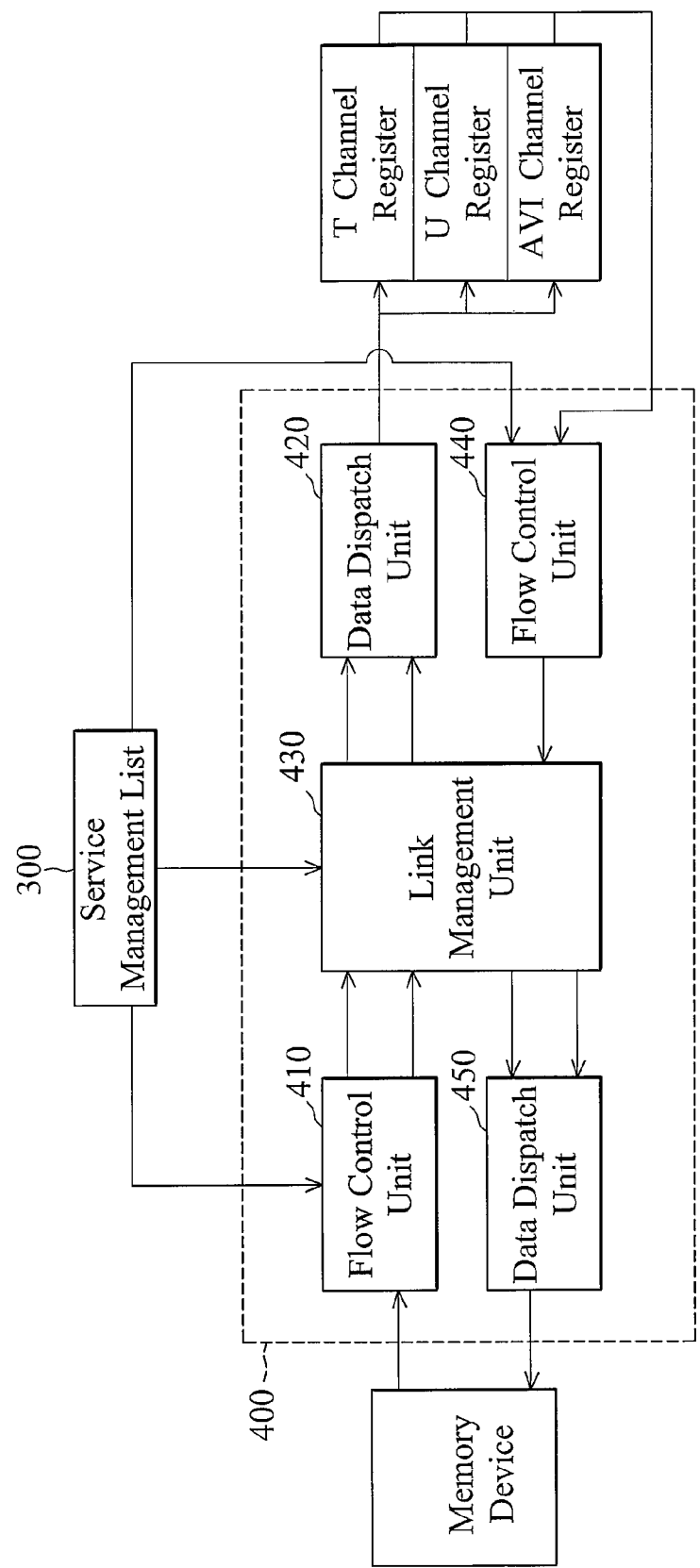
FIG. 3 is a schematic view of a data link control module 400 of the present invention.

FIG. 3 is a schematic view of a data link control module 400 of the present invention.

The data link control module 400 at least comprises flow control units 410 and 440, a link management unit 430, and data dispatch units 420 and 450. The data link control module 400 performs system data stream control and management according to information allocated by the service management module 100, in the service management list 300.

The flow control units 410 and 440 are responsible for controlling a data extraction rate from a memory or register for controlling system flow rate and, based on device memory addresses, channel register addresses, and bandwidth information allocated by the service management module 100 and stored in the service management list 300, extracts data according to allocated bandwidth depending on device memories or register addresses corresponding to different information sources and transmits the data to the link management unit 430.

The link management unit 430 is responsible for link management of data packets to determine file sequences and transmission destinations of data. If the information source of the service is the portable device, the link management unit 430 packs a file header with link information in a data packet transmitted from a device memory via the flow control unit 410 and link management unit 430 determines a file sequence and a transmission destination corresponding to the data packet and transmits the data packet to the data dispatch unit 420. If the information source of the service is the MOST network 700, the link management unit 430 unpacks the file header with the link information of the data packet transmitted from the channel register via the flow control unit 440 to determine the file sequence and the transmission destination corresponding to the data packet and transmits the data packet to the data dispatch unit 450.

The data dispatch units 420 and 450 are responsible for dispatching transmitted data to a corresponding channel register or device memory address. If the information source of a service is the portable device, the data dispatch unit 420 verifies a channel and a channel register address of data transmitted from a device memory and forwards, to a related channel, and writes the data in a corresponding channel register address. If the information source of the service is the MOST network 700, the data dispatch unit 450 verifies a device memory address of data transmitted from the channel register and writes the data in a corresponding device memory address.

Figure 4:
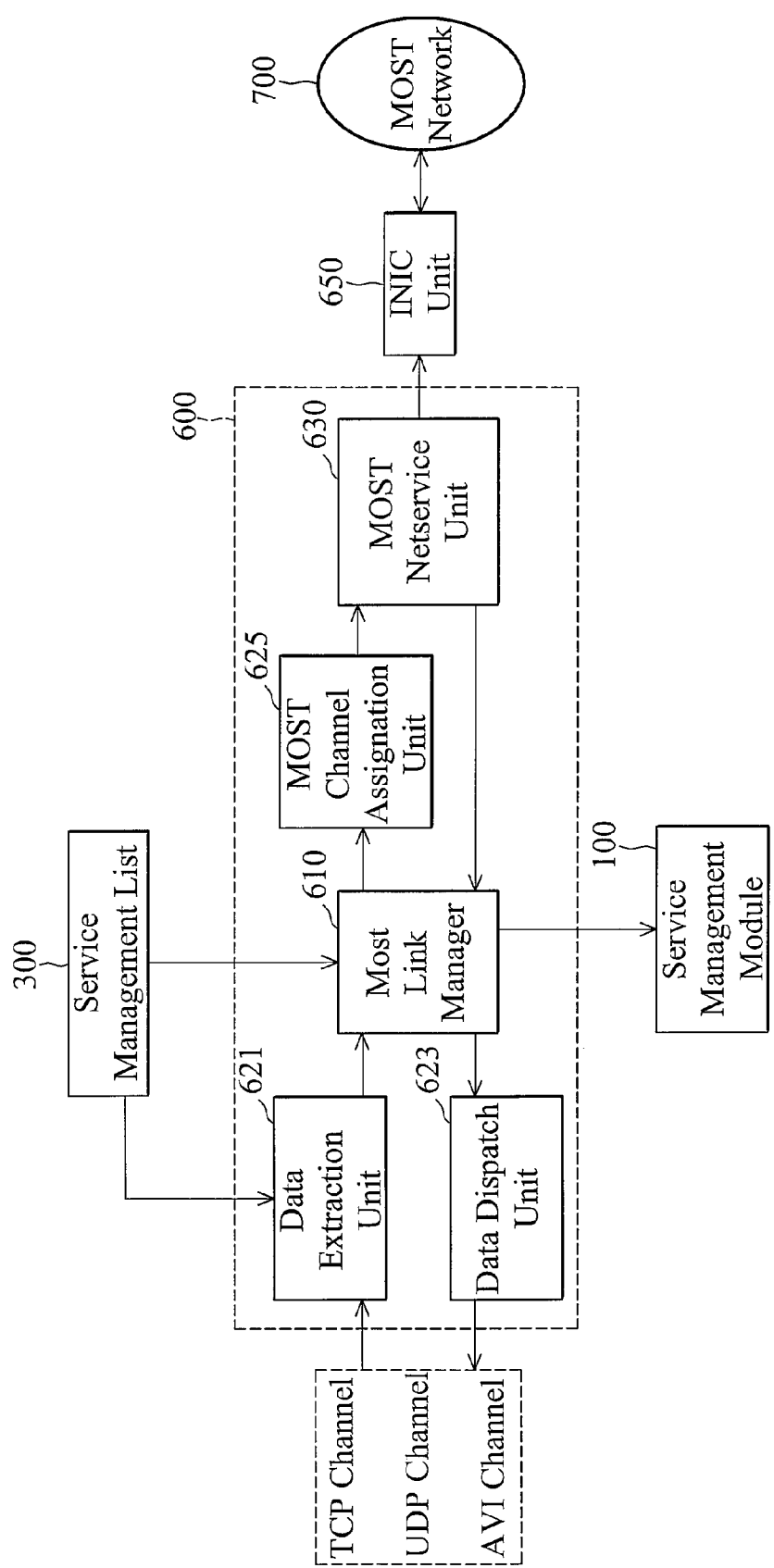
FIG. 4 is a schematic view of a protocol conversion module 600 of the present invention.

FIG. 4 is a schematic view of a protocol conversion module 600 of the present invention.

The protocol conversion module 600 at least comprises a MOST link manager 610 and a MOST netservice unit 630. The protocol conversion module 600 retrieves data packets from a channel register based on the information stored in the service management list 300 to perform a MOST link management operation and implement a packaged or an unpackaged operation to the retrieved data packets for access of the MOST network 700.

If the information source of the service is the portable device, the MOST link manager 610 retrieves a data packet of the service from the channel register via a data extraction unit 621, unpacks a file header with link information of the data packet, compares the file header with the service management list 300 to obtain relative control information, and provides the control information for the MOST netservice unit 630 via a MOST channel assignment unit 625 to pack the data packet, and generate plural MOST channel allocation and control parameters based on service requirements for application to synchronous data, asynchronous data, and control data for data channel allocation.

If the information source of the service is the MOST network 700, the MOST link manager 610 retrieves a control signal from a data packet returned from the MOST network 700, provides current service states for the MOST network 700 and retrieves the link information corresponding to the service from the service management list 300 to pack the file header with the link information of the data packet, transmits the data packet to the data dispatch unit 623, and stores the data packet in the channel register.

The MOST netservice unit 630 corresponds to application services for the MOST standard and is used to process data of synchronous, asynchronous, and controllable types. An intelligent network interface Controller (INIC) unit 650 is accessed using a low level driver and the INIT unit 650 implements packet access to a physical layer of the MOST network 700.

Figure 5A:
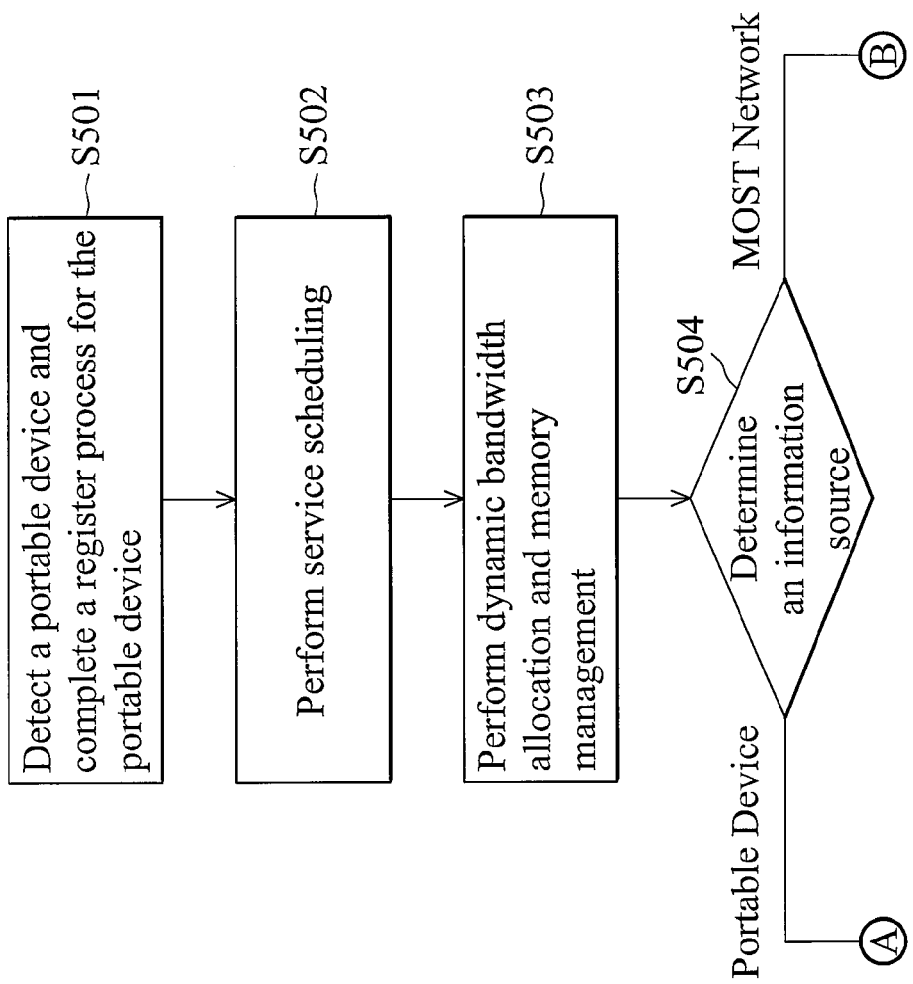
FIGS. 5a and 5b are flowcharts of a multimedia data sharing method for a MOST network of the present invention.
Figure 5A:
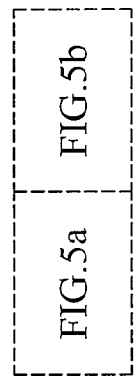
Figure 5B:
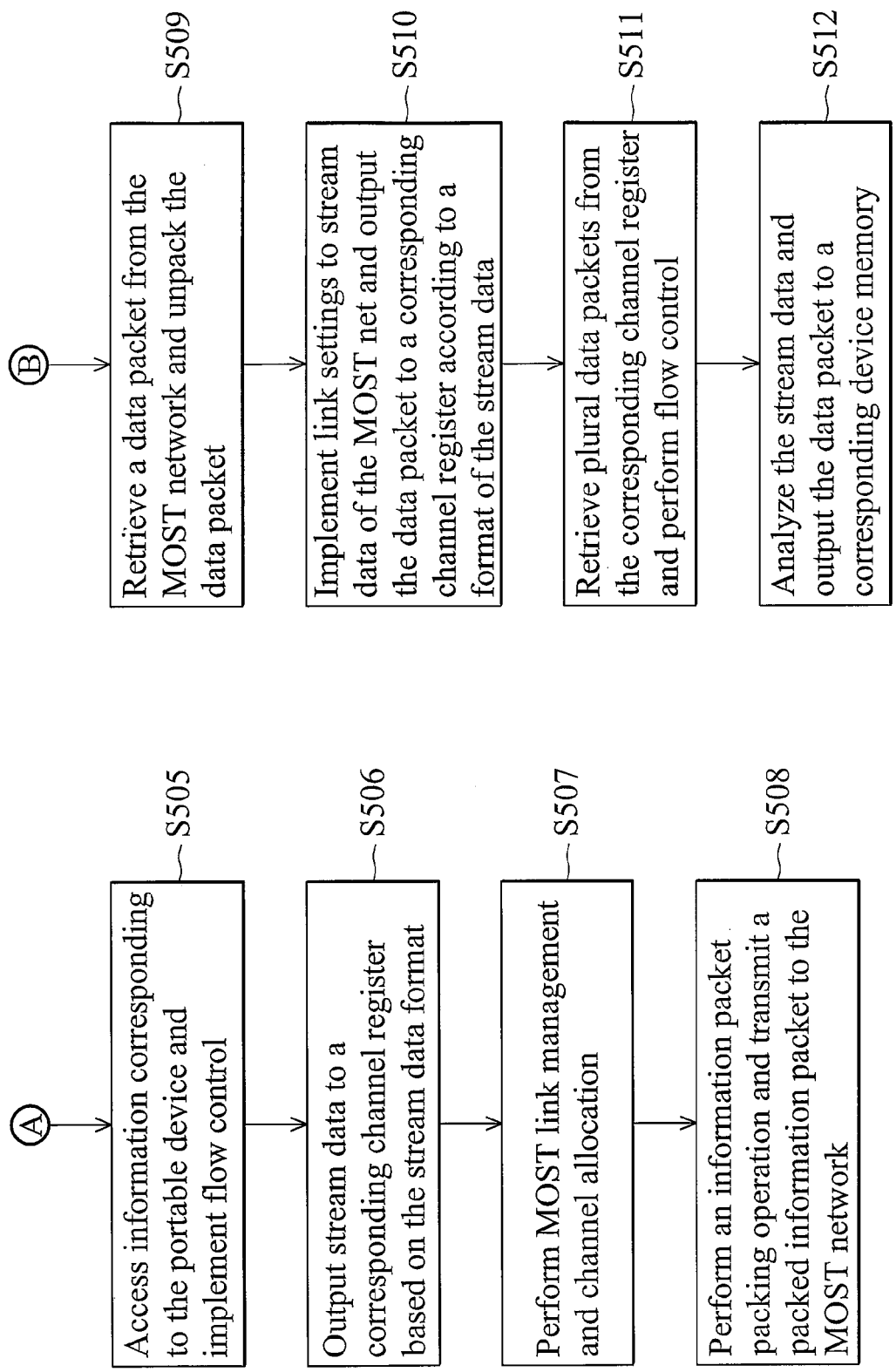

FIGS. 5A and 5B are flowcharts of a multimedia data sharing method for a MOST network of the present invention.

When a portable device being plugged in is detected, a service management module is activated and a registration process for the portable device is completed (step S501). A service command instructed by a human-machine interface is detected and a service scheduling method is performed to complete service registration (step S502). Dynamic bandwidth allocation and memory management are performed based on the service states of the portable device and performed results are stored in a service management list (step S503). A service is activated and an information source of the service is determined (step S504). Step S504 determines whether the requested service is shared or unshared, depending on whether the requested service is private. If the information source is the portable device, a data link control module is activated to access information corresponding to the portable device from a device memory according to the service management list and flow control is implemented (step S505). A link management process is performed to implement a link setting to stream data from the portable device and the stream data is output to a corresponding channel register based on the stream data format (step S506). A protocol conversion module is activated to read required data from the corresponding channel register according to corresponding information in the service management list (step S507). A MOST network service operation is performed to perform an information packet packing operation and transmit a packed information packet to the MOST network (step S508).

If the information source is the MOST network, a protocol conversion module is activated and a MOST net service operation is performed to retrieve a data packet from the MOST network and unpack the data packet (step S509). A MOST link management process is performed which implements link settings to stream data of the MOST net according to the service management list and output the data packet to a corresponding channel register according to a format of the stream data (step S510). The data link control module is activated to retrieve plural data packets from the corresponding channel register based on corresponding information in the service management list and a flow control operation is performed (step S511). A link management process is performed to analyze the stream data and output the data packet to a corresponding device memory according to the service management list (step S512).

Figure 6A:
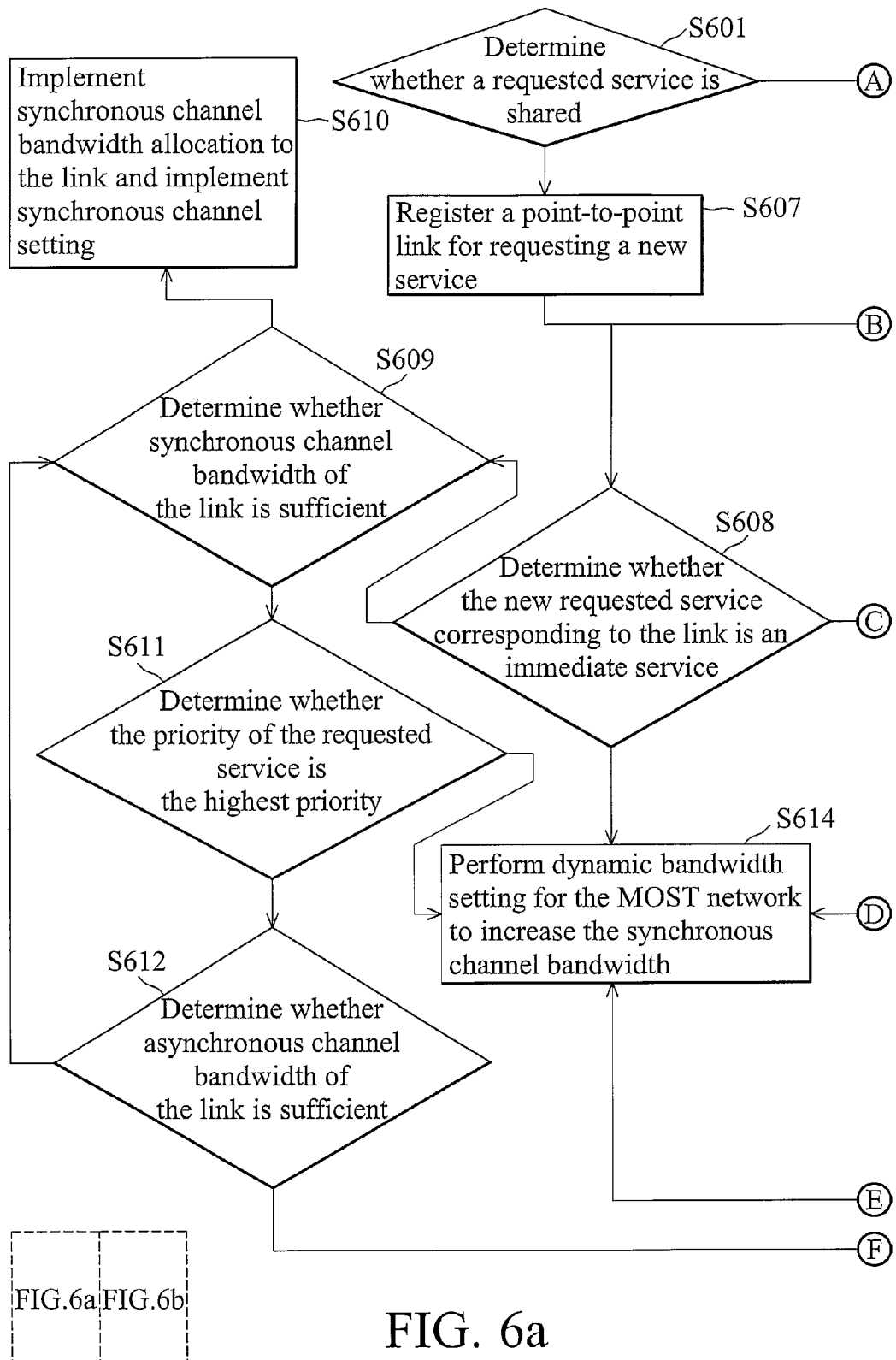
FIGS. 6a and 6b are schematic views of a method for sharing multimedia data shown in FIGS. 5a and 5b are of the present invention.
Figure 6B:
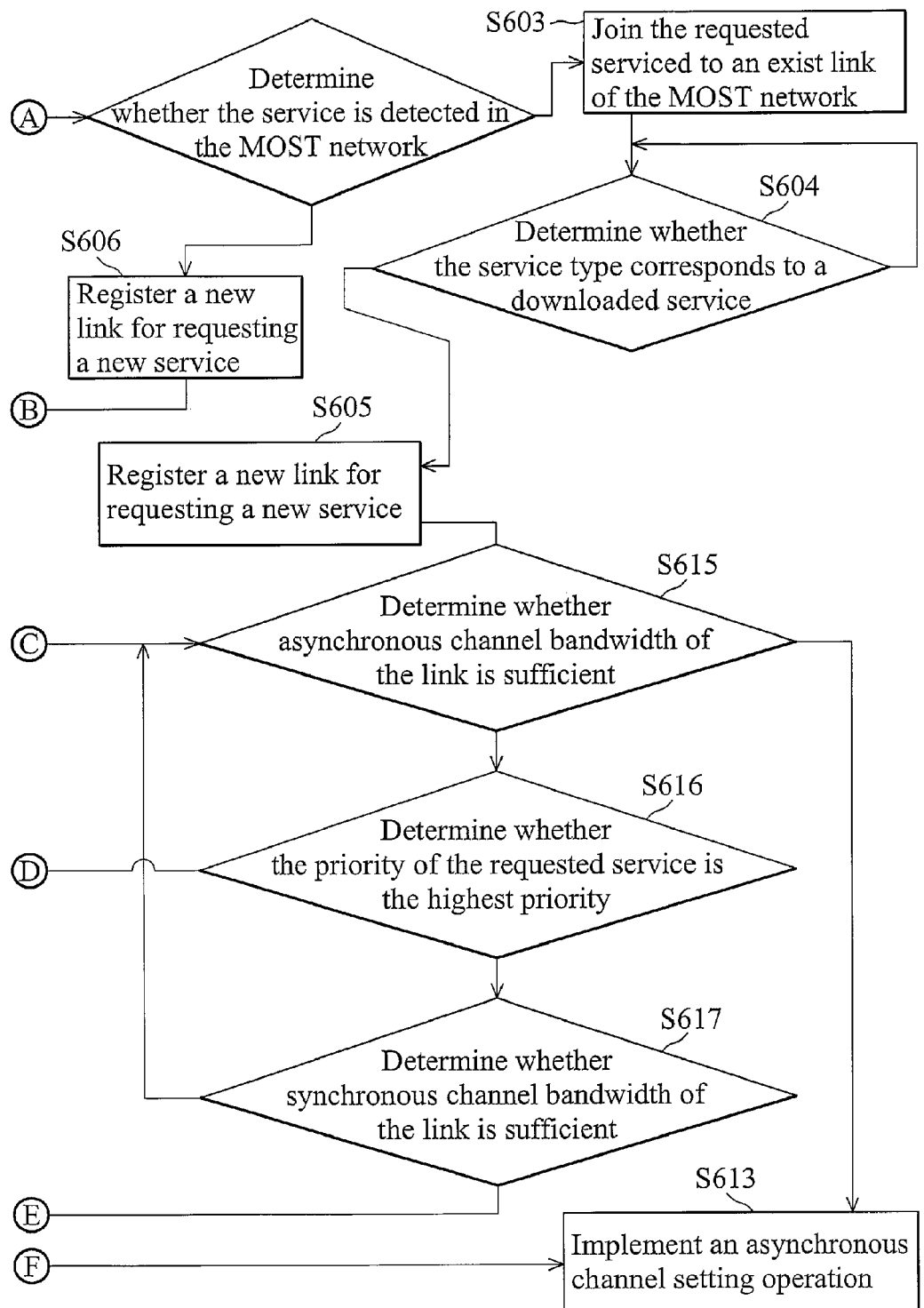

FIGS. 6A and 6B are schematic views of a method for sharing multimedia data shown in FIGS. 5A and 5B are of the present invention.

It is determined whether a requested service is shared or unshared (step S601), depending on whether the requested service is private. If the requested service is shared, it is then determined whether the service is detected in the MOST network (step S602). If the service is detected in the MOST network, the requested service is joined to an existent link of the MOST network (step S603). It is determined whether the service type corresponds to a downloaded service (step S604). If the service type corresponds to the downloaded service, a new link is registered for requesting a new service to download remaining file contents (step S605).) If the service is not detected in the MOST network, a new link is registered for requesting a new service (step S606). If the requested service is not shared, a point-to-point link is registered for requesting a new service (step S607).

It is determined whether the new requested service corresponding to the link is an immediate service (step S608). If the service corresponding to the link is an immediate service, it is determined whether synchronous channel bandwidth of the link is sufficient (step S609). If the synchronous channel bandwidth is sufficient, synchronous channel bandwidth allocation is implemented to the link and a synchronous channel setting operation is implemented (step S610). If the synchronous channel bandwidth is insufficient, when the priority of the requested service is not the highest priority (step S611), and asynchronous channel bandwidth of the link is sufficient (step S612), an asynchronous channel setting operation is implemented (step S613). When the synchronous channel bandwidth is insufficient and the priority of the requested service is the highest priority (step S611), a dynamic bandwidth setting operation for the MOST network is performed to increase the synchronous channel bandwidth (step S614), and the process proceeds to step S608.

If the service corresponding to the link is not an immediate service, it is determined whether asynchronous channel bandwidth of the link is sufficient (step S615). If the asynchronous channel bandwidth is sufficient, an asynchronous channel setting operation is implemented (step S613). If the asynchronous channel bandwidth is insufficient and the priority of the requested service is the highest priority, a dynamic bandwidth setting operation for the MOST network is performed to increase the asynchronous channel bandwidth (step S614), and the process proceeds to step S608. If the asynchronous channel bandwidth is insufficient, when the priority of the requested service is not the highest priority (step S616), and the synchronous channel bandwidth of the link is sufficient (step S617), a dynamic bandwidth setting operation for the MOST network is performed to increase the asynchronous channel bandwidth, and the process proceeds to step S608.

An embodiment of the multimedia data sharing system and method is applied for access of a MOST network. Connectivity and information sharing of a telematics network is enhanced by utilizing heterogeneous network interface transformation of one-for-multiple bus systems, dynamic bandwidth allocation, and information link management, and mutual transmission between the one-for-multiple bus systems is achieved using a protocol conversion method. Additionally, mutual transmission of information for multiple bus systems is provided, interface conversion between the MOST network and various heterogeneous networks is supported, and dynamic bandwidth allocation and information link management are applied, achieving better stability of multiplexing transmission and greater expandability of portable interfaces.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multimedia data sharing method for a Media Oriented Systems Transport (MOST) network, comprising:

when a portable device being plugged in is detected, activating a service management module and completing a registration process for the portable device;

detecting a service command instructed by a human-machine interface and performing a service scheduling method to complete service registration;

performing dynamic bandwidth allocation and memory management based on the service states of the portable device and storing performed results in a service management list;

activating a first service and determining an information source of the first service;

if the information source is the MOST network, activating a protocol conversion module and performing a MOST net service operation to retrieve, from the MOST network, and unpack a data packet;

performing a MOST link management process which implements link settings to stream data of the MOST net according to the service management list and output the data packet to a corresponding first channel register according to a format of the stream data;

activating a data link control module to retrieve plural data packets from the first channel register based on corresponding information in the service management list and perform a flow control operation; and performing a link management process to analyze the stream data and output the data packet to a corresponding first device memory according to the service management list.

2. The multimedia data sharing method for a MOST network as claimed in claim 1, further comprising:

if the information source is the portable device, activating the data link control module to access information corresponding to the portable device from a second device memory according to the service management list and implementing flow control;

performing the link management process to implement a link setting to stream data from the portable device and output the stream data to a corresponding second channel register based on the stream data format;

activating the protocol conversion module to read required data from the second channel register according to corresponding information in the service management list; and performing the MOST network service operation to perform an information packet packing operation and transmit a packed information packet to the MOST network.

3. The multimedia data sharing method for a MOST network as claimed in claim 1, further comprising:

determining whether the first service is shared;

if the first service is shared, determining whether the first service is detected in the MOST network;

if the first service is detected in the MOST network, joining the first service to an existent link of the MOST network and determining whether the first service type corresponds to a downloaded service;

if the first service type corresponds to the downloaded service, registering a new link; and if the first service is not shared, registering a point-to-point link.

4. The multimedia data sharing method for a MOST network as claimed in claim 1, wherein a new link is registered if the first service is not detected in the MOST network.

5. The multimedia data sharing method for a MOST network as claimed in claim 3, further comprising:

determining whether a second service corresponding to the link is an immediate service;

if the second service corresponding to the link is an immediate service, determining whether a synchronous operation is implemented to the channel bandwidth of the link;

if the synchronous operation is implemented to the channel bandwidth of the link, implementing a synchronous channel setting operation;

if the synchronous operation is not implemented to the channel bandwidth of the link, when priority of the second service is not the highest priority and an asynchronous channel setting operation is implemented to the channel bandwidth of the link, performing an asynchronous channel setting operation; and when the asynchronous channel setting operation is not implemented to the channel bandwidth of the link and the priority of the second service is the highest priority, performing a MOST network channel setting operation.

6. The multimedia data sharing method for a MOST network as claimed in claim 1, further comprising:

if second service corresponding to the link is not an immediate service, determining whether the asynchronous channel setting operation is implemented to the channel bandwidth of the link;

if the asynchronous channel setting operation is implemented to the channel bandwidth of the link, performing the asynchronous channel setting operation; and the asynchronous channel setting operation is not implemented to the channel bandwidth of the link, when the priority of the second service is not the highest priority and the asynchronous channel setting operation is implemented to the channel bandwidth of the link, performing the asynchronous channel setting operation.

7. A multimedia data sharing system for a Media Oriented Systems Transport (MOST) network, comprising:

at least one portable device;

a service management module, providing state analysis and management for services of the multimedia data sharing system and bandwidth or memory allocation for each service and recording the analyzed service states and configuration results in a service management list;

a data link control module, performing a control and management process for system data streams based on information, allocated by the service management module, and stored in the service management list; and a protocol conversion module, retrieving, based on the information stored in the service management list, data packets from a channel register to perform a MOST link management operation and implementing a packaged or an unpackaged operation to the retrieved data packets for access of the MOST network;

wherein the service management module at least comprises a service scheduling manager, further comprising:

a device register unit, when a plugged in portable device is detected, registering the portable device and recording information and content types relating to the portable device in the service management list;

a service control unit, collecting current service states from the MOST network, analyzing service information contents, creating service link information for providing reference data, storing the analyzed service information contents in the service management list, and dynamically adjusting contents of the service link information stored in the service management list when a service requirement is generated or terminated;

a data access control unit, receiving a command for a data access operation from the service control unit and performing the data access operation based on address information of a device memory in the service management list, wherein the service control unit notifies a dynamic bandwidth/memory manager and the data access control unit of performing a corresponding operation.

8. The multimedia data sharing system for a MOST network as claimed in claim 7, wherein the service management module at least comprises the dynamic bandwidth/memory manager, further comprising:

a device memory allocation unit, based on currently required services, performing a dynamic memory allocation operation according to different multimedia types and existing memory capacity;

a service bandwidth allocation unit, calculating the amount of allocated bandwidth to each service according to the bandwidth size required and priority sequence of a currently performed service and dynamically adjusting the bandwidth size; and a channel register allocation unit, performing the dynamic memory allocation operation for a channel register according to allocated bandwidth sizes for each service.

9. The multimedia data sharing system for a MOST network as claimed in claim 7, wherein the data link control module at least comprises a first flow control unit and a second flow control unit which are responsible for controlling a data extraction rate from a memory or register for controlling system flow rate and, based on a device memory address, a channel register address, and bandwidth information allocated by the service management module and stored in the service management list, extracts data according to allocated bandwidth depending on device memories or register addresses corresponding to different information sources.

10. The multimedia data sharing system for a MOST network as claimed in claim 9, wherein the data link control module at least comprises a link management unit which is responsible for link management of data packets to determine file sequences and transmission destinations of data, wherein the first and second flow control units extracts the data based on allocated bandwidth and transmits the extracted data to the link management unit.

11. The multimedia data sharing system for a MOST network as claimed in claim 10, wherein the data link control module at least comprises a first data dispatch unit and a second data dispatch unit which are responsible for dispatching transmitted data to a corresponding channel register or device memory address, wherein, if an information source of a service is a portable device, the first data dispatch unit verifies a channel and a channel register address of data transmitted from a device memory and forwards, to a related channel, and writes the data in a corresponding channel register address, and, if the information source of the service is the MOST network, the second data dispatch unit verifies a device memory address of data transmitted from the channel register and writes the data in a corresponding device memory address.

12. The multimedia data sharing system for a MOST network as claimed in claim 11, wherein, if the information source of the service is the portable device, the link management unit packs a file header with link information in a data packet transmitted from a device memory via the first flow control unit and the link management unit determines a file sequence and a transmission destination corresponding to the data packet and transmits the data packet to the first data dispatch unit, and, if the information source of the service is the MOST network, the link management unit unpacks the file header with the link information of the data packet transmitted from the channel register via the second flow control unit to determine the file sequence and the transmission destination corresponding to the data packet and transmits the data packet to the second data dispatch unit.

13. The multimedia data sharing system for a MOST network as claimed in claim 7, wherein the protocol conversion module at least comprises a MOST link manager, a MOST netservice unit, and a data dispatch unit, wherein, if an information source of a service is a portable device, the MOST link manager retrieves a data packet of the service from the channel register, unpacks a file header with link information of the data packet, compares the file header with the service management list to obtain relative control information, and provides the control information for the MOST netservice unit to pack the data packet and generate plural MOST channel allocation and control parameters based on service requirements for application to synchronous data, asynchronous data, and control data or data channel allocation.

14. The multimedia data sharing system for a MOST network as claimed in claim 13, wherein, if the information source of the service is the MOST network, the MOST link manager retrieves a control signal from a data packet returned from the MOST network, provides current service states for the MOST network and retrieves the link information corresponding to the service from the service management list to pack the file header with the link information of the data packet, transmit the data packet to the data dispatch unit, and store the data packet in the channel register.

* * * * *